June 6, 1933.  G. S. LANE  1,912,716
CLUTCH OR BRAKE MECHANISM
Filed Nov. 4, 1929  2 Sheets-Sheet 1
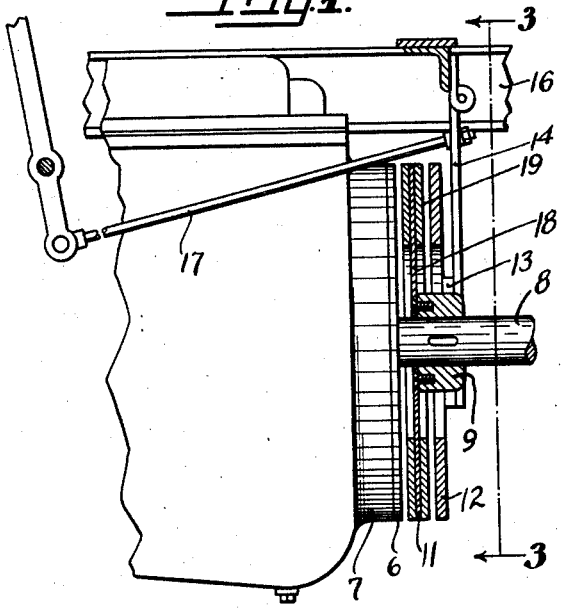
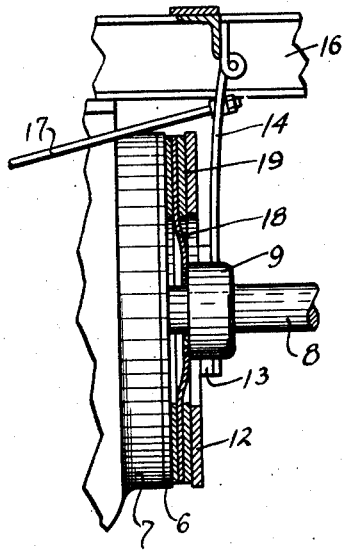
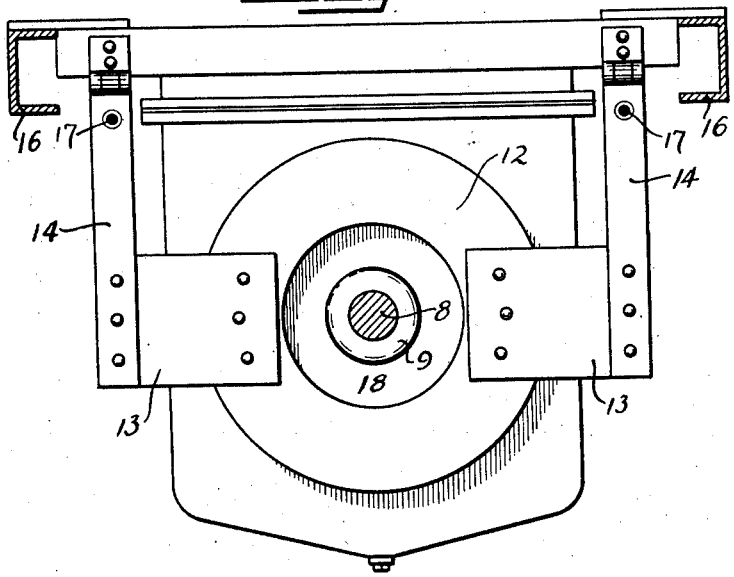
INVENTOR,
GEORGE S. LANE
BY
ATTORNEY.

June 6, 1933.  G. S. LANE  1,912,716
CLUTCH OR BRAKE MECHANISM
Filed Nov. 4, 1929  2 Sheets-Sheet 2
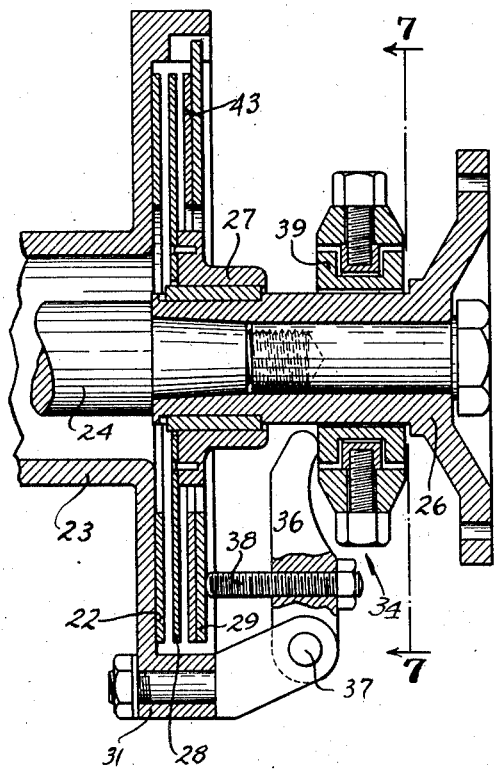
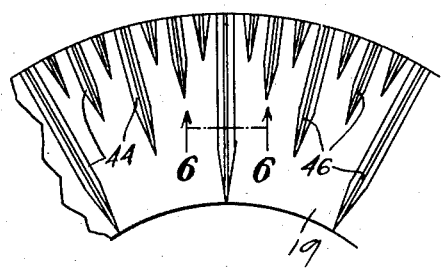
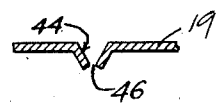
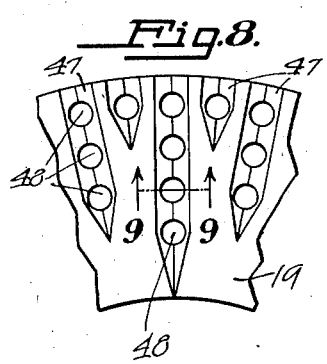
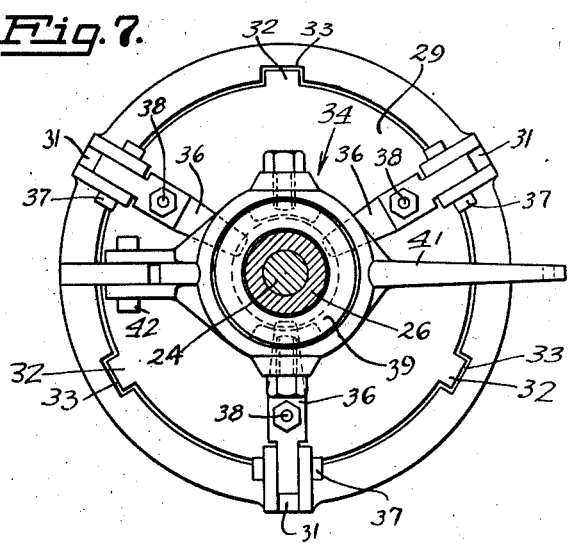
INVENTOR,
GEORGE S. LANE
BY Lincoln Johnson
ATTORNEY.

Patented June 6, 1933

1,912,716

UNITED STATES PATENT OFFICE

GEORGE S. LANE, OF SAN ANSELMO, CALIFORNIA, ASSIGNOR TO WALLACE SHEEHAN, OF SAN FRANCISCO, CALIFORNIA, AS TRUSTEE

CLUTCH OR BRAKE MECHANISM

Application filed November 4, 1929. Serial No. 404,690.

This invention relates to friction clutches and brakes and the like.

It is the primary object of the invention to provide a clutch or brake mechanism in which three discs cooperate to effect the frictional connection of two elements of the device, the frictional engagement of said discs being accomplished by the disposal of the discs in registering position, and by moving the outermost disc against the intermediate disc with such force as to press the same into frictional engagement with the innermost disc, the intermediate and innermost discs being connected to different, relatively rotatable elements of the mechanism, for instance, the intermediate disc may be connected to a rotary shaft, while the innermost element is connected to a complemental stationary element of a brake mechanism.

Other objects and advantages are to provide friction clutches and brakes and the like, that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings, wherein

Fig. 1 is a sectional view of a friction brake mechanism, assembled on a transmission mechanism;

Fig. 2 is a sectional view of the friction brake mechanism, showing the same in applied position;

Fig. 3 is an end view of the brake mechanism;

Fig. 4 is a sectional view of a modified arrangement of the friction brake mechanism;

Fig. 5 is a fragmentary view of a friction disc of the mechanism, showing the notches and slots, by which the friction area is corrected;

Fig. 6 is a fragmental sectional view of the friction disc, the section being taken on the line 6—6 of Fig. 5; and Fig. 7 is an end view of the modified form of the mechanism.

Fig. 8 is a fragmentary plan view of a disc showing the depressions with a plurality of perforations therethru; and Fig. 9 is a fragmental sectional view of the perforated frictional disc, shown in Fig. 8.

In carrying out my invention, I make use of a stationary disc 6, mounted on a stationary element of a machine, such as the transmission housing 7. From this transmission extends a rotary transmission shaft 8, upon which is fixed a sleeve 9, which latter in turn has a disc 11 fixedly mounted thereon, so as to face the stationary disc 6. A movable disc 12 is disposed in registry with the disc 11, and is supported by means of plates 13 upon spring brackets 14, the latter depending from a frame 16.

In order to apply the brake, the movable disc 12 is moved against the rotating disc 11 to urge the same into frictional contact with the stationary disc 6. The movable disc is actuated by brake rods 17, connected to the spring brackets 14 below the fixed ends thereof, whereby the said brackets are resiliently bent as shown in Fig. 2.

The disc 11 is constructed of a resiliently pliant, or flexible plate 18, on the opposite faces of which, adjacent to the peripheries thereof, are arranged comparatively rigid friction ring surfaces 19. Thus the central, or hub portion, of the disc 11 is flexible so as to allow the same to be bent thereat, when the friction surfaces 19 are subjected to pressure by the action of the movable disc 12. It is to be noted that the disc 12 is formed in a substantially ring shape, the width of which corresponds substantially to the width of the friction ring 19. In this manner the disc 12 is allowed to slide relatively to the sleeve 9, and leave the hub portion of the disc 11 free to flex.

The movement of the disc 12, therefore exerts a pressure on the friction rings 19, whereby the hub of the disc 11 is flexed allowing the urging of the inner friction ring face 19 into engagement with the stationary disc 6. Thus both faces of the rotating disc 11 are frictionally engaged with non-rotative surfaces, whereby rotation thereof is effectively retarded.

In the modified embodiment of the brake, shown in Figs. 4 and 7, the stationary disc 22 is mounted on the stationary casing 23 of the transmission shaft 24. At the end of the shaft 24 is the coupling flange 26 for the usual universal power shaft connection. On the hub of the casing 26 is slidably keyed a sleeve 27, upon which is fixedly mounted the intermediate, rotating disc 28, rotated with the casing 26, and with the shaft therein. A movable actuating disc 29 is slidably held in the periphery 31 of the housing 23, by means of radially protruding peripheral lugs 32, which are held against rotative movement by apertures 33. The apertures 33 are axially elongated, to allow the sliding movement of the disc 29. The disc 29 is apertured at the center thereof to be movable over the hub of the housing 26.

The brake is applied by moving the disc 29, against the intermediate rotative disc 28, thereby to urge the latter to slide the sleeve 27, until the disc 28 is brought into frictional engagement with the stationary disc 22 and is held frictionally at both faces thereof, by the respective discs 22 and 29.

The disc 29 is actuated by a brake actuating mechanism 34, which is constructed of a plurality of arms 36, each pivoted at the outer end 37 thereof on the housing periphery 31. In each arm 36, intermediate the ends thereof, is secured a set screw 38, the free end of which abuts against the outer face of the disc 29.

The free ends of the arms 36 are held against outward swinging by a collar 39, which is slidable on the outside periphery of the hub of the casing 26. The collar 39 has an actuating lever 41 connected thereto. An end of the lever 41 is pivoted on the housing periphery 31, as at 42. The free end of the lever 41 is connected to a brake rod. The collar is in engagement with the lever 41 intermediate the ends of the latter, so that the swinging of the lever 41 toward the discs, moves the collar 39 against the free ends of the arms 36. The movement of the collar 39, turns the arms 36 around their respective pivots, urging the set screws 38 against the disc 29. In this manner the disc 29 forces the rotating disc 28 into frictional engagement with the stationary disc 22, at the same time the disc 29 itself is in firm frictional engagement with the adjacent face of the disc 28. Movement of the lever 41 in the opposite direction permits the throwing of the discs 28 and 29 out of their frictional engagement, thereby releasing the brake.

It is to be noted that friction faces or friction rings, may be arranged on the face of either one of the discs; in the modified embodiment, the disc 29 has a friction face 43 on the operative face thereof.

The friction face 43, as well as the friction ring faces 19 of the first embodiment, are indented in the manner illustrated in Figs. 5 and 6. In order to distribute the frictional area of the disc face in a desired manner, some portions of the face are rendered inactive by notches or depressions on the said face. The forming of such notches, or depressions, and slots on the friction discs has not only the effect of distributing the frictional forces on the disc, but also it dissipates the heat caused by friction. Another result of the use of such interrupted friction surface, is the elimination of squeaks, rendering the operation of such brakes noiseless.

The depressions in the illustration in Fig. 5, are arranged to equalize the circumferential frictional area of the disc. The entire ring friction face is divided into four circumferential zones, and radial depressions 44 are provided in equally spaced relation for each zone, extending from the periphery of the friction face to the inner boundary of the respective zone. The inner ends of the depressions 44 are of such width that the active frictional areas in the respective zones are equal, thereby equalizing the frictional force at all radial distances from the center of the disc.

The depressions 44, or other means to render certain portions of the friction surface inactive, may be arranged for any other desired distribution of friction area. The depressions 44 have slots 46 cut in the bottoms thereof, leaving the bottom edges of said depressions exposed and spaced from each other, to more efficintly conduct the friction-generated heat from the disc. It will be noted that any of the friction faces of the brake or clutch mechanism may be corrected in the aforesaid manner, to improve its efficiency, render its operation noiseless, and increase the life of the disc.

In the modified form shown in Fig. 8, the depressions 47 are formed, instead of a slot, with a plurality of holes or perforations 48, to provide the heat radiating surfaces. The perforations are so arranged as to leave the tapered corners of the depressions 47 free.

Having thus described this invention, what I claim and desire to secure by Letters Patent is:

1. The combination with two elements of a rotary mechanism, one element being rotatable relatively to the other, of an inner disc fixed to the second element, an outer disc, a yieldable plate to support the outer disc against rotation in an operative relation to said second element, said outer disc being slidably axially; a third disc, intermediate between the inner and outer discs, being held on the first element and being rotatable therewith; and means to move said second disc against the intermediate disc, thereby to press said intermediate disc into frictional engagement with the inner disc, said discs being disposed in registering relation to each other, the friction face of one of the discs having notches thereon arranged to reduce the friction area thereat, the notches being slotted so as to expose heat radiating edges on the inactive face of the notched disc.

2. In combination a stationary element of a mechanism, a rotary element operatively related to the stationary element; a stationary disc on the stationary element; a non-rotative disc slidably held relatively to the stationary element and spaced from the first disc, a rotative disc on the rotating element disposed between the first mentioned two discs, said discs being in registering position relatively to each other; means to move said non-rotative, slidable disc against the rotative disc to press the same into frictional engagement with the stationary disc, thereby to resist the rotation of the rotary element, said rotative disc comprising a flexible central portion; and friction ring surfaces adjacent the outside periphery thereof for engagement with the respective discs, when the central portion is flexed by the forced movement of the non-rotative disc against the respective friction surface of the rotative disc.

3. In combination a stationary element of a mechanism, a rotary element operatively related to the stationary element; a stationary disc on the stationary element; a non-rotative disc slidably held relatively to the stationary element and spaced from the first disc, a rotative disc on the rotating element disposed between the first mentioned two discs, said discs being in registering position relatively to each other; means to move said non-rotative, slidable disc against the rotative disc, to press the same into frictional engagement with the stationary disc, thereby to resist the rotation of the rotary element; and friction ring surfaces adjacent the outside periphery of the rotative disc for engagement with the respective discs, the disc being flexible by the forced movement of the non-rotative disc against the respective friction surface of the rotative disc.

4. In combination a stationary element of a mechanism, a rotary element operatively related to the stationary element, a stationary disc on the stationary element; a non-rotative disc slidably held relatively to the stationary element and spaced from the first disc, a rotative disc on the rotating element disposed between the first mentioned two discs, said discs being in registering position relatively to each other; and means to move said non-rotative, slidable disc against the rotative disc to press the same into frictional engagement with the stationary disc, thereby to resist the rotation of the rotary element, said rotative disc being flexible, friction ring surfaces adjacent the outside periphery of the disc for engagement with the respective discs when the hub is flexed by the forces movement of the non-rotative disc against the respective friction surface of the rotative disc, a flexible support for the said non-rotative disc, and means connected to said flexible support to operate said last mentioned disc.

5. In combination a stationary element of a mechanism, a rotary element operatively related to the stationary element; a stationary disc on the stationary element; a non-rotative disc slidably held relatively to the stationary element and spaced from the first disc, a rotative disc on the rotating element disposed between the first mentioned two discs, said discs being in registering position relatively to each other; and means to move said non-rotative, slidable disc against the rotative disc to press the same into frictional engagement with the stationary disc, thereby to resist the rotation of the rotary element; means to connect the rotative disc to the rotating element so as to rotate with said last mentioned element, and to be slid into frictional engagement with the stationary and non-rotative disc, when acted upon by the latter; a friction face provided on the sliding, non-rotative disc, friction facings adjacent the outside periphery of the rotative disc, the said rotative disc being flexible between the said connecting means and the said friction facings.

6. In combination with a rotary element and stationary member, of a mechanism of the character described, a disc fixed on the stationary member, another disc slidable on and rotatable by the rotary element, and a third disc disposed opposite the second disc so that the discs are in alignment with each other, yieldable means of connection between the third disc and the said member to hold the third disc against rotation, and means connected to the yieldable means to move the third disc against the second disc at will, thereby to press the second disc between the other two discs.

In testimony whereof, I have hereunto set my hand at San Francisco, California, this 22d day of October 1929.

GEORGE S. LANE.